United States Patent
Carlisle

[11] 3,881,122
[45] Apr. 29, 1975

[54] ELECTRIC MOTOR WITH PARALLEL SPACED AXES

[76] Inventor: Henry W. Carlisle, Spring Grove, Minn. 55974

[22] Filed: Aug. 2, 1973

[21] Appl. No.: 385,035

[52] U.S. Cl............................ 310/115; 310/156
[51] Int. Cl. ........................................ H02k 23/60
[58] Field of Search ............ 310/42, 152, 112, 114, 310/115, 117, 118, 120, 121, 122, 124, 126, 156, 158, 152, 177, 45, 243

[56] References Cited
UNITED STATES PATENTS

| | | | |
|---|---|---|---|
| 2,666,863 | 1/1954 | Davis | 310/112 |
| 3,151,285 | 9/1964 | Rainey | 310/152 |
| 3,174,065 | 3/1965 | Jaun | 310/112 |
| 3,273,001 | 9/1966 | Baermann | 310/156 |
| 3,465,185 | 9/1969 | Rollig | 310/112 |
| 3,539,887 | 10/1970 | Dennick | 310/115 |
| 3,631,273 | 12/1971 | Stein | 310/46 |

Primary Examiner—R. Skudy
Attorney, Agent, or Firm—Dorsey, Marquart, Windhorst, West and Halladay

[57] ABSTRACT

An electric motor is formed of two rotors, each rotating about its axis of rotation parallel to and spaced from the other, and in synchronism with the other's rotation. The magnetic field about each rotor's axis of rotation reacts with the other's to produce motor forces about each axis. In the preferred embodiment one rotor has a magnetic member in the form of a coil, and the other rotor has a magnetic member in the form of a permanent magnet assembly. The coil is powered by a D.C. source with a commutator changing the direction of the electrical excitation of the coil in synchronism with the rotation of the motor.

13 Claims, 3 Drawing Figures

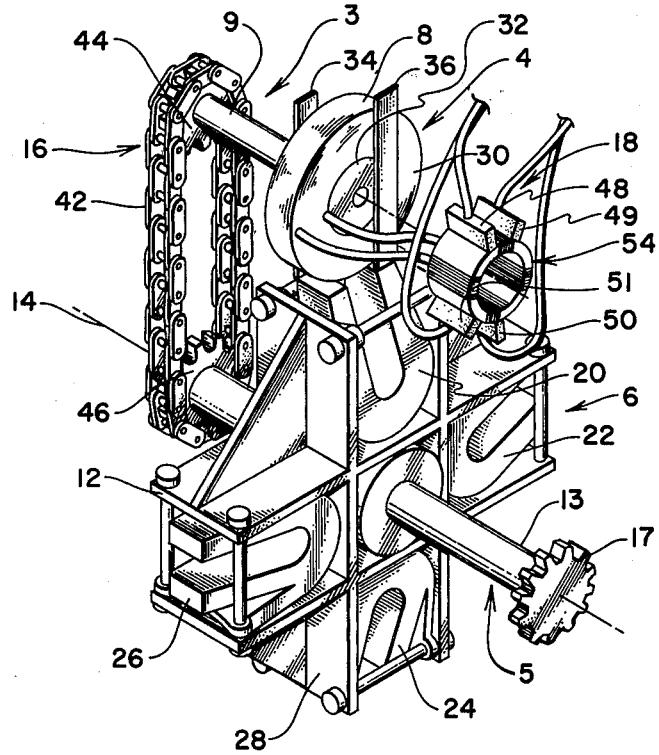

ELECTRIC MOTOR WITH PARALLEL SPACED AXES

BACKGROUND OF THE INVENTION

1. Field of the Invention

This invention concerns the general field of electric motors and presents a different form of an electric motor wherein two rotors are positioned with their axes of rotation in a parallel, spaced configuration. The preferred embodiment of the invention is in the form of a D.C. motor with the source of magnetic force in one rotor formed of a field coil, and in the other rotor of permanent magnets. The principles of the invention are, however, not confined to the D.C. motor and apply to other forms of D.C. and A.C. motors.

2. Description of the Prior Art

The general prior art of the electric motor is well known. The fundamental prior art motor comprises a rotor rotating about its axis while producing a rotating magnetic field. A stator encircles the rotor and produces a magnetic field through which the rotor continually rotates. In the case of an A.C. motor both the rotor and the stator are formed of coils, with the fluctuating magnetic fields naturally formed by the A.C. current and reacting with one another to produce the motor drive. In the case of a D.C. motor the rotor or stator may be formed of a permanent magnet, with at least one or the other formed of a coil. A switching means such as a commutator is present in the D.C. motor to switch the direction of current in the coil in synchronism with the rotation of the motor, in order to produce the changes in magnetic field necessary for production of the motor drive.

An example of a D.C. motor with a permanent magnet rotor is described in the Vanghan Patent, U.S. Pat. No. 3,426,223. The Vanghan motor uses a drum permanent magnet as the rotor, with the stator in the form of a rectangular coil encompassing the drum. A cam and contact switch the current running through the coil in synchronism to the rotation of the rotor.

Some motors have been developed with two rotors rotating simultaneously about the same axis of rotation. In the Spaulding Patent, U.S. Pat. No. 516,843, the armature rotates within the field magnet assembly rotating about the same axis of rotation. The rotors counter-rotate through a geared drive, with commutator brushes providing the necessary current connections. A similar configuration of an armature rotating within a rotating field magnet assembly and about the same axis of rotation can be found in the Brietenbach Patent, U.S. Pat. No. 1,348,539. None of these prior art motors contain two rotors rotating simultaneously about two different spaced and parallel axes of rotation.

SUMMARY OF THE INVENTION

This invention presents an electric motor in the novel configuration of having a first magnetic means rotatable about a first axis of rotation for producing a magnetic field about the first axis, and a second magnet means rotatable about a second axis of rotation for producing a magnetic field about the second axis. The second axis is parallel to and spaced from the first axis for allowing a motor reaction between the two magnetic fields. A connecting means between the first and second magnetic means maintains their rotation in synchronism.

In the configuration of an A.C. motor the magnetic means will generally take the form of coils, each rotatable about its respective axis of rotation. In the configuration of a D.C. motor the magnetic means can take the form of coils or of a coil in combination with a permanent magnet assembly. In the D.C. motor, switching means are present for changing the direction of the electrical excitation of a coil in synchronism to the rotation of the motor.

In the general case each rotor is rotatable about an axis of rotation transverse to or, more precisely, perpendicular to the magnetic axis of the magnetic means on the rotor. The magnetic fields produced about the rotors react with each other to produce the motor forces on the rotors.

The motor as developed in this invention is highly efficient, requiring a low starting current and developing a high starting torque output.

BRIEF DESCRIPTION OF THE DRAWINGS

FIG. 1 is an isometric illustration of the internal parts of the motor, with the support case and bearings removed; and FIG. 2 is a schematic diagram of the motor; and FIG. 3 is a schematic diagram of an alternative embodiment of the motor.

DETAILED DESCRIPTION OF THE INVENTION

The preferred embodiment of the invention is a double rotor DC motor, with each rotor rotating about its own axis of rotation parallel to and spaced from the other's axis. One rotor has a magnetic means in the form of a multiple pole permanent magnet assembly. The other has a magnetic means in the form of a drum wound electromagnet with pole bands. The rotors have a chain and sprocket drive between them for maintaining their rotation in synchronism. A commutator is present for changing the direction of the electrical excitation of the electromagnet in synchronism to the rotation of the motor.

As discussed more fully below, this invention is particularly adaptable to variations in embodiments under the teachings of the invention. For example, an AC motor can be constructed under these principles. Different forms of magnetic means could be utilized such as the use of a coil instead of the permanent magnet assembly in the DC motor. Different drives for maintaining the rotation of the axes in synchronism could be used, as could different forms of switching means for changing the direction of the electrical excitation. All of these adaptations could be readily made while retaining the basic configuration of rotors rotating about spaced parallel axes.

With reference to the preferred embodiment in FIG. 1, a DC motor is indicated at 2. This motor 2 contains two rotors 3 and 5, each with a magnetic means 4 and 6 for producing a magnetic field about its axis. First magnetic means 4 is in the form of a drum wound electromagnetic coil 8 attached to an axle 9 which produces a magnetic field about its axis of rotation, the first axis of rotation 10. Second magnetic means 6 is in the form of a multipolar permanent magnet assembly 12 attached to an axle 13 and acting as an armature producing a magnetic field about its axis of rotation, the second axis of rotation 14. Connecting means, here in the form of a chain and sprocket drive shown at 16, are between the first magnetic means 4 and the second magnetic means 6 for maintaining the rotation of the first and second magnetic means in synchronism. Switching means, here in the form of a commutator shown at 18, are attached to the axle 9 of the first magnetic means 4 for changing the direction of the electrical excitation of the first magnetic means 4 in synchronism to the rotation of the motor.

The first magentic means 4 and the second magnetic means 6 each establishes its own magnetic field about its axis of rotation. These magnetic fields react to each other to produce the motor forces on the rotors, rotating the rotors and producing a motor output which can be taken off either rotor. In the preferred embodiment, the motor output is taken off an output sprocket 17 on the axle 13 attached to the second magnetic means 6.

The second magnetic means 6 is in the form of a multipolar permanent magnet assembly 12, producing a magnetic field about the second axis of rotation 14. More specifically, the permanent magnet assembly 12 is formed of four U-shaped permanent magnets 20, 22, 24 and 26, secured in an aluminum frame 28 along its quadrants and facing outward from the axis of rotation 14. The frame 28 is constructed of aluminum, a nonmagnetic material, in order to avoid affecting the magnetic fields of the motor. A frame of a magnetic material such as iron, for example, would affect the magnetic fields adversely, diminishing the motor's performance. The poles of the magnets are arranged to lie adjacent to similar poles around the perimeter of the assembly 12 as shown in FIG. 2. The permanent magnet assembly 12 produces magnetic fields which are coplanar along the plane intersecting all of the poles of the magnets 20, 22, 24 and 26, i.e., the magnetic fields lie in the plane of the paper in FIG. 2. The second axis of rotation 14 runs transverse to these coplanar magnetic fields. In the embodiment depicted in these drawings, the axis 14 runs perpendicular to the coplanar magnetic fields. This assembly 12 produces magnetic fields about the second axis 14. As the assembly 12 rotates about the second axis 14, the magnetic fields accordingly rotate about the second axis 14, reacting with the magnetic fields of the first magnetic means 4 to produce a motor force about the axes.

The first magnetic means 4 is a coil 8 in the form of a drum wound electromagnet with pole bands. More specifically, the coil 8 is of the type well known in the art, formed of a winding 30 in the shape of a drum, about a metal core 32, with two metal pole bands 34 and 36. The first pole band 34 runs lateral to one face 35 of the coil, adjacent the axle 9 and extending beyond the outer edges of the winding 30. The second pole band 36 runs lateral to the opposite face 37 of the coil, parallel to the first pole band 34 and offset to the other side of the axle 9. The pole bands 34 and 36 produce magnetic fields which are coplanar along the plane parallel to the face 38 of the coil 8, i.e., the magnetic fields lie parallel to the plane of the paper in FIG. 2. The first axis of rotation 10 runs transverse to these coplanar magnetic fields, and in the embodiment depicted in these drawings, the axis 10 runs perpendicular to the coplanar magnetic fields. The coil 8, when excited, produces magnetic fields about the first axis 10. As the coil 8 rotates about the first axis 10, the magnetic fields accordingly rotate about the first axis 10, reacting with the magnetic fields of the second magnetic means 6 to produce a motor force about the axes.

An alternative configuration of the coil 8 is formed with the pole bands 34 and 36 further extending across the winding 30 the width of the permanent magnets 20, 22, 24 or 26. Specifically, the ends of pole bands 34 and 36 run lateral to the outer edge of the drum shaped coil. This configuration also produces the requisite magnetic fields.

Connecting means here in the form of a chain and sprocket drive 16 are between the first axis 10 and the second axis 14. This chain and sprocket drive 16 has a chain 42 running between a sprocket 44 connected to the first axle 9 and a sprocket 46 connected to the second axle 13. The drive 16 keeps the rotation of the two rotors in synchronism and in the preferred embodiment keeps the two rotors rotating in the same direction. In the preferred embodiment the coil 8 is rotated at twice the speed of the permanent magnet assembly 12 by means of the sprocket 44 having half the teeth of the sprocket 46. The coil 8 of the preferred embodiment must have its direction of excitement changed at the proper time relative to the position of the magnetic field produced by the second magnetic means 6 in order that the magnetic fields react properly to produce the resultant motor forces. In the preferred embodiment this timing is achieved by maintaining the axles in synchronous rotation. While a chain and sprocket drive 16 is used in the preferred embodiment, other connecting means could be used to maintain the synchronism of the axles' rotation. For example, a geared drive consisting of a series of gears could be connected between the two axles 9 and 13. In the motor of the preferred embodiment, an odd number of gears would have to be inserted between the sprockets 44 and 46 to maintain the rotation of the axles in the same direction. Other connecting means are also possible, such as a non-slip belt and pully drive.

As stated above, the object of maintaining the rotation of the axles in synchronism is to allow the proper timing of the change in direction of excitement of the coil 8. The actual changing of the direction of excitement of the coil is accomplished in the preferred embodiment by the use of a commutator 18 attached to the first axle 9. The commutator 18 illustrated is of standard design, having four contact brushes 48, 49, 50 and 51 attached electrically to an external power source 52. The ring 54 of the commutator contains eight sections, with conductive sections 55, 56, 57 and 58 alternating with non-conductive sections 59, 60, 61 and 62. The brushes 48, 49, 50 and 51 are placed around the ring, as illustrated in FIG. 2. Two of the conductive sections, 55 and 56 are electrically connected to each other and to one lead of the coil 8. The other two conductive sections 57 and 58 are connected to the other lead of the coil 8.

As the commutator rotates, current is switched six times during a complete rotation of the commutator. For example, in the position illustrated in FIG. 2 the brushes 48 and 50 are connected to conductive sections 55 and 57, respectively. After the commutator has rotated forty-five degrees, the brushes 48 and 50 are disconnected from the conductive sections and connected to nonconductive sections 59 and 61 respectively. At the same time the brushes 49 and 51 are now connected to conductive sections 56 and 58, respectively, reversing the current through the coil by reversing the connection of the power source 52 across the coil. As is evident from the drawing, a new circuit between the brushes and the conductive sections of the commutator is completed at every forty-five degree rotation of the commutator. The current, however, is only switched in direction through the coil for six times during a complete rotation of the commutator, which reversals are appropriate for the timing of the motor as illustrated.

For purposes of clarity, the external frame of the motor with support bearings for the axles is omitted. Such a frame is readily apparent and includes a frame for the support of the motor, with support bearings for maintaining the rotation of the axles about their axes of rotation.

FIG. 2 illustrates by a schematic diagram the configuration of the magnetic fields in the motor. As illustrated, the permanent magnet assembly 12 contains its four U-shaped permanent magnets 20, 22, 24 and 26 rotating in a counterclockwise manner, as viewed in FIG. 2, about the axis of rotation 14. The coil 8 with its pole bands 34 and 36 also rotates in a counterclockwise manner, about its axis of rotation 10 with the commutator ring 54 rotating with the rotating of the coil 8. As discussed previously, the rate of rotation of the axle 9 is twice that of axle 13.

The magnetic poles of the U-shaped magnets are alternately aligned as noted in FIG. 2. The coil 8 is aligned to the permanent magnet assembly 12 so that the portions of the pole bands along the edge of the coil 8 meet the poles of the U-shaped magnets directly when each U-shaped magnet is facing the coil directly. FIG. 2 illustrates the alignment at the precise time that the U-shaped magnet 20 faces the coil 8 directly. At this time, as seen in the Figure, the portions of the pole bands 34 and 36 along the edge of the coil 8 lie in their closest relationship to the corresponding poles of the magnet 20. At the time illustrated in FIG. 2, the coil 8 has just been reversed in excitation from its previous excitation. Previous to this point, pole band 36 was of a "north" polarity, with pole band 34 of a "south" polarity. At that previous time, the north pole, band 36, was being repelled by the north pole of the magnet 20 and attracted by the south pole of the magnet 20. The south pole, band 34, was being attracted by the north pole of the magnet 20. All of the forces resulting from that alignment of the poles produced torques about the axes of revolution 10 and 14, resulting in the motor output. At the time now illustrated, the pole band 36 is of a south polarity, with the pole band 34 of a north polarity. Pole band 36 is now repelled by the south pole of magnet 20 with pole band 34 attracted by the south pole of magnet 20 and repelled by the north pole of magnet 20, again resulting in the torques necessary for the motor output.

The fact that the coil 8 has just been reversed in current is evident from the commutator, where the contact brushes 48 and 50 have just engaged a set of commutator sections 55 and 57. The coil 8 will be kept in its present state of excitation until the rotor has made an approximately forty-five degree rotation, at which time the brushes 49 and 51 engage the next set of commutator sections 56 and 58 and reverse the current in the coil 8. The next magnet 22 meets the coil 8 as the coil has completed a 180° rotation. The analysis of the magnetic poles and forces present at this time is similar to that of the alignment of FIG. 2. This switching of the excitation of the poles continually occurs as the axes rotate.

The motor as described has several highly desirable characteristics. In general, the motor has a high starting torque with relatively low startup current and low overall current consumption. A model of the motor as described in the preferred embodiment has been constructed developing 1 ¼ horsepower at 13.5 volts DC, drawing 5 amperes.

Several variations in embodiments of this invention will be apparent from these teachings. In the general field of the motor art as defined by the prior art, it is known that those prior art motor principles of using a rotating magnetic field within another magnetic field to produce motor torque can be adapted in different embodiments. Specifically, both AC and DC motors work on basically the same principle of a rotor rotating within a magnetic field produced by an encircling stator. Similarly, the principle of the present invention of two rotors rotating about spaced parallel axes is readily adaptable to various forms of AC and DC motors.

In way of example of modifications readily made on the invention, a DC motor could be constructed using another coil instead of the permanent magnet assembly 12. Different forms of connecting means between the first and second magnetic means could be constructed such as the use of a geared drive. Different forms of switching means could be constructed, such as a relay driven by a cam on the first axle 9, changing the direction of the electrical excitation of the coil in synchronism to the rotation of the motor. An AC motor could be constructed, in which case switching means for changing the direction of the electrical excitation of a rotor would not be necessary since the current inherently switch itself.

A different form of modification readily made on the preferred embodiment would be to change the timing of the rotors relative to one another. For example, the first magnetic means 4 could be made to rotate at four times the revolutions per minute of the second magnetic means 6, with commensurate changes in the timing and rate of switching of the direction of electrical excitation of the first magnetic means 4 in synchronism to the rotation of the motor.

Other modifications to the invention will be evident to skilled persons in this art, and the above discussion should not limit the scope of the invention.

I claim:
1. A motor comprising:
   a first magnetic means in the form of a coil rotatable about a first axis of rotation and excitable by a current source for producing a magnetic field about the first axis having a magnetic axis transverse to the first axis of rotation;
   a second magnetic means rotatable about a second axis of rotation for producing a magnetic field about the second axis, the second axis being parallel to and spaced from the first axis for allowing motor reaction between the magnetic fields of the first and second magnetic means; and
   connecting means between the first and second magnetic means for maintaining the rotation of the first and second magnetic means in synchronism.
2. The motor of claim 1 wherein:
   the first magnetic means is in the form of a coil rotatable about the first axis of rotation and excitable by an alternating current source to produce a magnetic axis transverse to the first axis of rotation; and the second magnetic means is in the form of a coil rotatable about the second axis of rotation and excitable by an alternating current source to produce a magnetic axis transverse to the second axis of rotation.

3. The motor of claim 1 wherein:

the coil of the first magnetic means is excitable by a direct current source; and the motor further comprises switching means for changing the direction of the electrical excitation of the first magnetic means in synchronism to the rotation of the motor.

4. The motor of claim 3 wherein the coil is in the form of a drum wound electromagnet with pole bands producing coplanar magnetic axes, and with the first axis of rotation perpendicular to the coplanar magnetic axes of the drum.

5. The motor of claim 3 wherein the second magnetic means is in the form of a permanent magnet assembly with the magnetic axes of the permanent magnet assembly coplanar and with the second axes of rotation perpendicular to the coplanar magnetic axes of the permanent magnet assembly.

6. A direct current motor comprising:

a coil in the form of an electromagnet rotatable about a first axis of rotation transverse to its magnetic axis;

an armature in the form of a permanent magnet rotatable about a second axis of rotation transverse to its magnetic axis and parallel to and spaced from the first axis of rotation allowing motor reaction between the magnetic fields of the field coil and the armature;

connecting means between the coil and the armature for maintaining the rotation of the coil and the armature in synchronism; and switching means for changing the direction of the electrical excitation of the coil in synchronism to the rotation of the motor.

7. The direct current motor of claim 6 wherein the coil is in the form of a drum would electromagnet with pole bands producing coplanar magnetic axes, and with the first axis of rotation perpendicular to the coplanar magnetic axes.

8. The direct current motor of claim 6 wherein the armature is in the form of a multipolar permanent magnet assembly with the magnetic axes of the permanent magnet assembly coplanar, and with the second axis of rotation perpendicular to the coplanar magnetic axes.

9. The direct current motor of claim 6 wherein the connecting means for maintaining the rotation of the coil and the armature in synchronism comprises a geared drive connecting the first axis of rotation with the second axis of rotation.

10. The direct current motor of claim 6 wherein the connecting means for maintaining the rotation of the coil and the armature in synchronism comprises a chain and sprocket drive means connecting the first axis of rotation with the second axis of rotation.

11. The direct current motor of claim 6 wherein the switching means for changing the direction of the electrical excitation in synchronism to the rotation of the motor comprises a commutator connected to the first axis of rotation.

12. The direct current motor of claim 6 wherein the switching means for changing the direction of the electrical excitation in synchronism to the rotation of the motor comprises a relay switch controlled by the first axis of rotation.

13. A direct current motor comprising:

a coil in the form of an electromagnet rotatable about a first axis of rotation transverse to its magnetic axis;

an armature in the form of an electromagnet rotatable about a second axis of rotation transverse to its magnetic axis, and parallel to and spaced from the first axis of rotation;

connecting means between the coil and the armature for maintaining the rotation of the coil and the armature in synchronism; and switching means within the motor for changing the direction of the electrical excitation of the coil in synchronism to the rotation of the motor.

* * * * *